United States Patent
Levit (10) Patent No.: US 8,000,234 B2
(45) Date of Patent: Aug. 16, 2011

(54) DYNAMIC BANDWIDTH ALLOCATION BASED ON PARTIAL CYCLES

(75) Inventor: Guy Levit, Macabbim (IL)

(73) Assignee: PMC-Sierra Israel Ltd., Herzliya (IL)

( * ) Notice: Subject to any disclaimer, the term of this patent is extended or adjusted under 35 U.S.C. 154(b) by 362 days.

(21) Appl. No.: 11/575,568

(22) PCT Filed: Jan. 22, 2006

(86) PCT No.: PCT/IL2006/000088
§ 371 (c)(1),
(2), (4) Date: Apr. 20, 2009

(87) PCT Pub. No.: WO2006/106499
PCT Pub. Date: Oct. 12, 2006

(65) Prior Publication Data
US 2009/0213874 A1      Aug. 27, 2009

Related U.S. Application Data

(60) Provisional application No. 60/667,768, filed on Apr. 4, 2005.

(51) Int. Cl.
*G01R 31/08* (2006.01)
(52) U.S. Cl. .................................. 370/230; 370/468
(58) Field of Classification Search ............. 370/412, 370/390, 230–234, 394–395.7, 468–469, 370/907, 82, 83; 398/72, 66
See application file for complete search history.

(56) References Cited

U.S. PATENT DOCUMENTS

| | | | | |
|---|---|---|---|---|
| 5,499,244 A * | 3/1996 | Mosch et al. | ................. | 370/529 |
| 2004/0008703 A1 * | 1/2004 | Kim et al. | ..................... | 370/401 |
| 2004/0057462 A1 * | 3/2004 | Lim et al. | ..................... | 370/468 |
| 2004/0264963 A1 * | 12/2004 | Kani et al. | ....................... | 398/72 |
| 2006/0133809 A1 * | 6/2006 | Chow et al. | ..................... | 398/66 |
| 2008/0181248 A1 * | 7/2008 | Haran et al. | ................. | 370/412 |
| 2009/0213874 A1 * | 8/2009 | Levit | ............................ | 370/468 |

FOREIGN PATENT DOCUMENTS

WO    WO2006/006499    10/2006

OTHER PUBLICATIONS

"*Gigibit-capable Passive Optical Networks (G-PON): ONT management and control interface specification*" International Telecommuication Union G.984.4, Feb. 2008.

(Continued)

*Primary Examiner* — Pao Sinkantarakorn
*Assistant Examiner* — Iqbal Zaidi
(74) *Attorney, Agent, or Firm* — Mark M. Friedman (57) ABSTRACT

A method for dynamic bandwidth allocation (DBA) in a passive optical network (PON) comprises the steps of: in a configuration stage, dividing a predetermined grant cycle into N parts, dividing by an optical line terminal (OLT) a plurality of optical network units (ONUs) into N ONU groups and in each cycle part, concurrently allocating grants to ONUs of one ONU group while having the ONUs of at least one other ONU group send reports and data to the OLT. In a preferred embodiment, the cycle is divided into two fixed half cycles.

18 Claims, 8 Drawing Sheets

OTHER PUBLICATIONS

"Gigibit-capable Passive Optical Networks (G-PON): General characteristics" International Telecommuication Union G.984.1, Mar. 2008.

"Gigibit-capable Passive Optical Networks (G-PON): Physical media Dependent (PMD) layer specification" International Telecommuication Union G.984.2, Mar. 2008.

"Gigibit-capable Passive Optical Networks (G-PON): Transmission convergence layer specification" International Telecommuication Union G.984.4, Mar. 2008.

"Part 3: Carrier sense multiple access with collision detection (CSMA/CD) access method and physical layer specifications" IEEE Computer Society. Sep. 2004.

* cited by examiner

DYNAMIC BANDWIDTH ALLOCATION BASED ON PARTIAL CYCLES

FIELD OF THE INVENTION

The present invention relates generally to Passive Optical Networks (PONs), and more particularly to Dynamic Bandwidth Allocation (DBA) methods used in such networks.

BACKGROUND OF THE INVENTION

The Ethernet PON (EPON) uses 1 gigabit per second (Gpbs) Ethernet transport, and the Gigabit PON (GPON) uses up to 2.5 Gbps of Ethernet transport. Both are suitable for very high-speed data applications, as well as for converged system support (telephone, video, etc.). The unprecedented amount of bandwidth in both is directed toward, and arriving from a single entity, the Optical Network Unit (ONU).

An Optical Line Terminal (OLT) manages remotely the transmission of each ONU. The OLT and the ONUs exchange messages. In each cycle of such an exchange, the OLT grants a grant to each ONU, which is answered by a report message from the ONU. The concept of "cycle" as used herein is explained in detail in PCT application PCT IL03/00702 by Onn Haran et al., filed 26 Aug. 2003, and titled "Methods for dynamic bandwidth allocation and queue management in Ethernet Passive Optical Networks", which is incorporated herein by reference. The ONU has a queue manager that prepares queue status information, which is transmitted using Multipoint Control Protocol (MPCP) messages to the OLT to enable smart management. In other words, the ONU "informs its internal queues status" to the OLT. The OLT management is executed using a DBA algorithm. An efficient DBA algorithm is essential to guarantee Quality of Service (QoS), required to fulfill a Service Level Agreement (SLA). A SLA typically includes, among other things, a guaranteed BW, which is the BW that is allocated to an ONU whenever the ONU asks for it, regardless of the network load. Operator revenues are expected to increase from selling sophisticated SLAs to customers. High bandwidth utilization allows adding more customers to the network. Thus, an efficient DBA algorithm is an enabler to operator revenues.

Fragmentation loss is the amount of wasted grant time that is not utilized for packet transmission. The subject is also explained in detail in PCT application PCT IL03/00702. The reason for fragmentation is a lack of synchronization between the ONU queue status and the OLT knowledge of queue status. When this happens, the fragmentation can result in empty grant transmission, when the pending packets are larger than the given grant. This effect increases the transmission delay.

Figure 1:
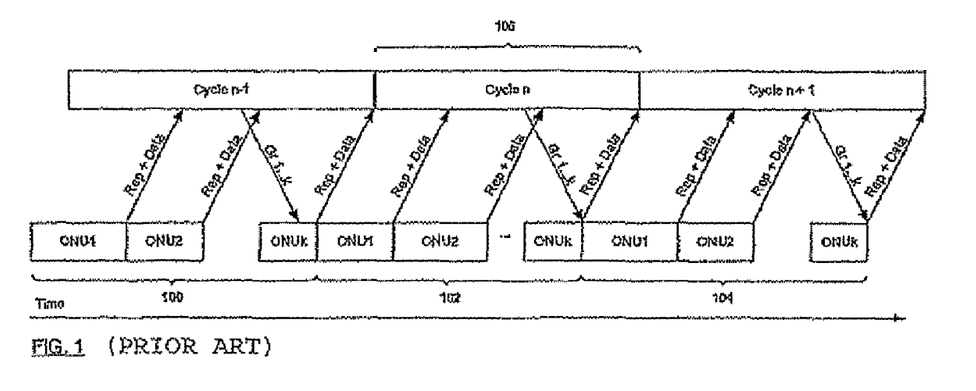
FIG. 1 shows schematically a known reporting and granting scheme.

The basic existing schemes for reporting and granting cause fragmentation loss by damaging the synchronization between the OLT and an ONU. FIG. 1 presents such a reporting and granting scheme and the resulting damage to the synchronization. All k ONUs (ONU1 . . . ONUk) transmit their data and report their updated queue occupancy in step 100 (cycle n−1). The DBA in the OLT processes the reports in step 106 (cycle n) and determines the grants for transmissions occurring in step 104 (cycle n+1). While the DBA process the reports in step 106, the ONUs send more updated reports in step 102 (cycle n). The synchronization loss is caused because in step 104 the ONU already transmits some of the data that was reported in step 102, although the OLT meant to grant this data for step 104.

Figure 2:
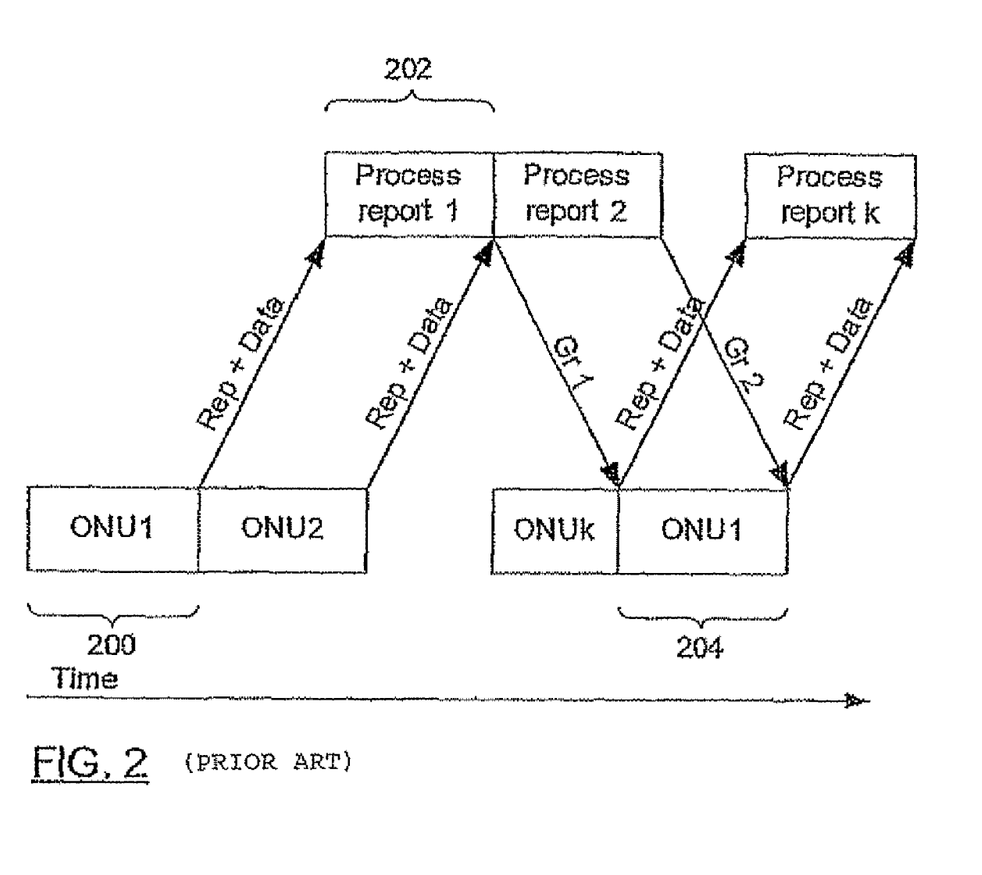
FIG. 2 shows schematically a known greedy algorithm solution to the fragmentation loss problem.

Other solutions require processing the reports one by one ("greedy algorithms"), as depicted in FIG. 2. In these solutions, there is no "cycle" notion, but there may be a boundary on the round robin time, sometimes referred to as "max cycle". An ONU (e.g. ONU1) reports in step 200, the report is processed in step 202 and the ONU is granted for step 204. Since the reports are processed one by one, the DBA does not have the whole picture of the network load while processing the request.

There is therefore a widely recognized need for, and it would be highly advantageous to have, a DBA method that aids synchronization between the OLT and each ONU to reduce fragmentation loss and increase overall operation efficiency.

SUMMARY OF THE INVENTION

This present invention discloses a new DBA algorithm (method) that aids synchronization between the OLT and ONUs and reduces fragmentation loss in a PON. The method is based on "partial" cycles (or "cycle parts"), most preferably half cycles, with one group of ONUs granted in each partial cycle. An embodiment of such "half cycle division" is presented in detail below. However, while the "half cycle" embodiment is preferred, we emphasize the more general idea that a cycle, which is either predetermined or varying, may be divided into more than two parts, with the algorithm capable of being advantageously applied in such cases too.

The DBA algorithm processes several reports at a time, gaining knowledge of the network's load, as opposed to DBA algorithms that process a single report at a time (e.g. greedy algorithms). The use of half (or more generally 1/N where $N \geq 2$) cycles reduce fragmentation by employing a queue freeze mechanism in each ONU. Under this mechanism, each ONU first transmits the data it has already reported and only then transmits the rest of the data, regardless of the time the data entered the ONU queues, rather than starting with the high priority traffic and then moving to the low priority traffic. To allow several allocation sizes without introducing fragmentation loss, an additional mechanism of "threshold reporting" is used. Under this mechanism, the ONU reports its queue capacity in whole frames up to a certain threshold. Upon receiving a grant, the ONU starts by transmitting the data that was reported as "below threshold" data, then transmits the rest of the data that was reported and eventually transmits data that was not reported. Although this mechanism could be used with several thresholds, in the preferred embodiment one threshold suffices.

In addition and advantageously, there is no need for special gates for reports, saving utilization loss due to optical overheads. The elimination of a specific gate for a report is enabled by having a certainty that a grant was processed before a report was issued. In each case, there is no more than a single pending grant, which is based on the latest report.

In some embodiments, the solution presented herein can be also seen as an improvement on a greedy algorithm or an "immediate response algorithm", where each report is followed immediately by a grant. However and in contrast, the major difference vs. those two algorithm types lies in the added fairness resulting from processing reports of a plurality of ONUs concurrently, rather than processing a report of a single ONU at a time.

According to the present invention there is provided a method for dynamic bandwidth allocation in a PON that includes an OLT functionally coupled to a plurality of ONUs comprising the steps of: in a configuration stage, dividing a predetermined grant cycle into N parts; by the OLT, dividing the plurality of ONUs into N ONU groups; and in each cycle part, concurrently allocating grants to ONUs of one group while having the ONUs of at least one other group send reports and data to the OLT.

In some embodiments of the method, the step of dividing a predetermined grant cycle into N parts includes dividing the predetermined grant cycle into two cycle parts and the step of dividing the plurality of ONUs into N ONU groups includes dividing the plurality of ONUs into two ONU groups.

In some embodiments of the method, the dividing the predetermined grant cycle into two cycle parts includes dividing the predefined cycle into two half cycles.

In some embodiments of the method, the dividing the plurality of ONUs into two ONU groups includes dividing the plurality of ONUs into two fixed ONU groups.

In some embodiments of the method, each ONU has a SLA that includes two services, a guaranteed bandwidth and a best effort bandwidth, and the dividing the plurality of ONUs into two fixed ONU groups includes dividing in a way such that the DBA algorithm can at least allocate the guaranteed BW to all the ONUs of each ONU group.

In some embodiments of the method, the dividing in a way such that the DBA algorithm can at least allocate the guaranteed BW to all the ONUs of each ONU group includes sorting all the ONUs by an ascending order of their guaranteed BW and alternately dividing the sorted ONUs between the two ONU groups.

In some embodiments of the method, the alternately dividing the sorted ONUs between the two ONU groups includes checking if the addition of a remaining ONU to a respective ONU group causes a sum of the guaranteed BW of the ONUs in the respective ONU group to exceed a half line rate.

In some embodiments of the method, if the sum of the guaranteed BW of the ONUs in the respective ONU group exceeds the half line rate, the alternately dividing the sorted ONUs between the two ONU groups includes adding the remaining ONU to both ONU groups.

According to the present invention there is provided a method for dynamic bandwidth allocation in a PON that includes an OLT functionally coupled to a plurality of ONUs, the method comprising the steps of: in a configuration stage, dividing a predetermined grant cycle into two half cycles; by the OLT, dividing the plurality of ONUs into two ONU groups, each ONU having a SLA; and in each half cycle, allocating bandwidth (BW) fairly to all the ONUs of each ONU group.

In some embodiments of the method, the step of dividing the plurality of ONUs into two ONU groups includes dividing the ONUs into two fixed ONU groups, wherein the SLA includes a guaranteed BW for each ONU, and wherein the step of allocating BW fairly between the ONUs of each ONU group includes at least allocating the guaranteed BW to all the ONUs of each ONU group.

In some embodiments of the method, the step of dividing the plurality of ONUs into two ONU groups includes sorting all the ONUs into a sorted ONU list by ascending order of their guaranteed BW, and alternately adding ONUs from the sorted list to the two ONU groups.

In some embodiments of the method, the alternately adding ONUs from the sorted list to the two ONU groups includes checking the effect of the addition of a new ONU from the list on a sum of the guaranteed BW of each ONU in a ONU group and comparing the sum with a half line rate value, whereby the decision to add the new ONU to one or both ONU groups depends on the results of the comparison.

In some embodiments of the method, the allocating the guaranteed BW to all the ONUs of each ONU group includes granting each ONU below threshold reports as long as the guaranteed BW in the SLA is not exceeded.

In some embodiments of the method, the step of allocating BW fairly between the ONUs of each ONU group further includes allocating a remaining BW to at least some of the ONUs of the plurality as a best effort service (BES).

In some embodiments of the method, the allocating a remaining BW to all ONUs of the plurality as a BES includes sorting all ONUs to a list according to a fairness criterion and allocating the remaining BW following an order of ONUs on the list.

In some embodiments of the method, the method further comprises the step of checking if any of the ONUs in either ONU group has changed its status, and if yes, re-dividing the plurality of ONUs into two new ONU groups and repeating the step of, in each half cycle, allocating BW fairly to all the ONUs of each ONU group.

According to the present invention there is provided a method for dynamic bandwidth allocation in PON that includes an OLT functionally coupled to a plurality of ONUs comprising the steps of: accumulating R ONU reports, where $R \geq 2$; checking if the accumulated reports are in condition for processing; and if yes, processing reports according to a given criterion.

In some embodiments of the method, the step of checking includes checking if all the ONUs of a selected ONU group have their reports on the list and, if yes, performing the step of processing by concurrently allocating grants to the ONUs of the selected ONU group while having the ONUs of at least one other ONU group send reports and data to the OLT.

BRIEF DESCRIPTION OF THE DRAWINGS

The invention is herein described, by way of example only, with reference to the accompanying drawings, wherein.

DETAILED DESCRIPTION OF THE PREFERRED EMBODIMENTS

Principle of Operation

The DBA method of the present invention comprises in the most general sense three steps. In a configuration stage (not shown) a predefined grant cycle is divided by the OLT into N part cycles. Preferably N=2. In alternative embodiments, N is greater than 2. When N=2, the parts are preferably equal, i.e. "half cycles". The following description relates to this "half cycle" embodiment.

Figure 3A:
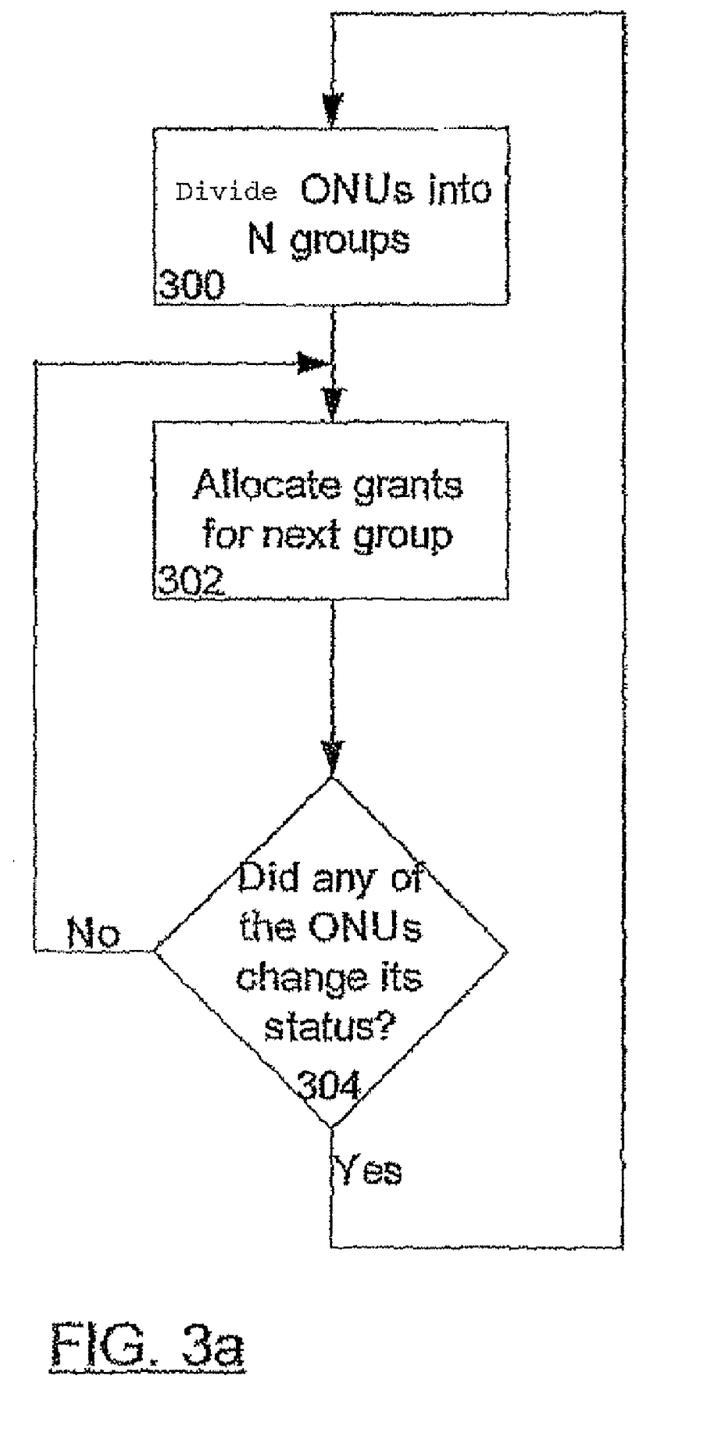
FIG. 3a shows the major steps of the "1/N part cycle" DBA method of the present invention.

In FIG. 3a, step 300 represents a "division" step, in which the ONUs are divided by the OLT into exemplarily two ONU groups. A preferred way to form the ONU groups is detailed below. Step 302 represents an "allocation" step. In this step, the DBA algorithm run by the OLT takes the reports of one ONU group (e.g. the first group) and allocates grants accordingly. Step 302 takes place simultaneously with the transmission of data and reports of the other ONU group. After each allocation step, the DBA algorithm checks in step 304 if any of the ONUs in either group has changed its status, i.e. whether it has registered, deregistered or changed its SLA. If there is a status change, there is a loop back to step 300, where the division takes place again and the ONUs of all (in this example two) groups are rearranged into new groups. Otherwise, in step 302 the DBA algorithm takes the reports of the other (in this case second) group and allocates grants accordingly. The check in step 304 is repeated, and if there is no status change, in step 302 the DBA algorithm takes the reports of the first group and allocates grants accordingly, and so on.

In a preferred embodiment, the ONUs are divided in step 300 into two fixed groups. Other embodiments (see e.g. FIG. 6) may include division into more than two groups, or into non-fixed groups. In such embodiments, the DBA algorithm can move ONUs between ONU groups. In each half cycle, ONUs of one group transmit (send) their data and reports while the DBA processes allocations for the other group. Details of the process flow are illustrated schematically in FIG. 3b and in a flow chart in FIG. 3c. Alternative embodiments may work with a cycle that is not fixed or a division in which the numbers of ONUs in the groups are not equal.

Figure 3B:
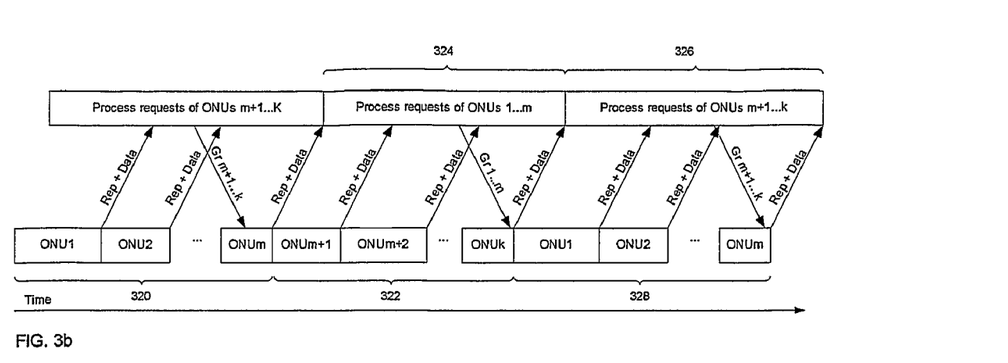
FIG. 3b shows schematically a reporting and granting scheme according to the "1/N cycle" DBA method of the present invention, where N=2.
Figure 3C:
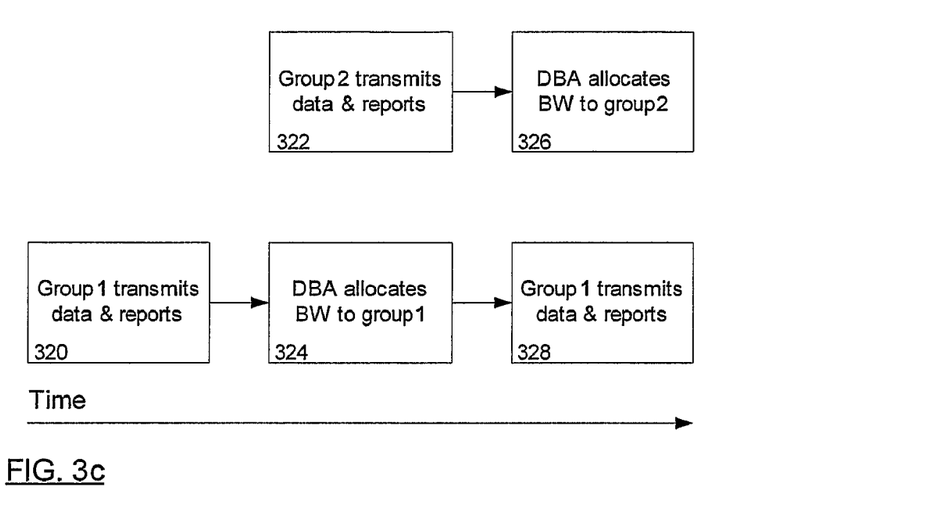
FIG. 3c shows the reporting and granting scheme of FIG. 3b in a flow chart representation.

For the example shown in FIGS. 3b and 3c assume that an exemplary PON includes n ONUs. The ONUs are divided into two ONU groups. Group 1 comprises ONUs 1 ... k (k<n) and group 2 comprises ONUs k+1 ... n. In use, as shown in FIGS. 3b and 3c, the ONUs of group 1 transmit their data and reports in step 320. The DBA allocates BW for group 1 in step 324 by processing the reports of group 1 and sending grants for step 326. The ONUs of group 2 transmit data and reports in step 322, which is performed concurrently (simultaneously) with step 324 (as shown on the time axis in FIG. 3c). In step 326, the DBA allocates BW for group 2 by processing the reports of group 2 and by sending grants concurrently with the grant sending of group 1 in step 328 (for which BW was allocated in step 324). In essence, the DBA interleaves the processing of reports of one ONU group with the transmission of data and reports of the other ONU group. Preferably, the number of ONUs in each group is roughly equal, to balance the processing time of the reports of each group. Nevertheless, the method can also be performed on non-equal groups (in terms of ONU numbers). The two major aspects of the method—the division of the ONUs between the groups and the allocation of the BW fairly between the ONUs—is further described in more detail below.

In the preferred embodiment, the SLA of each ONU comprises two services: a "guaranteed" BW, which is given to the ONU upon request, regardless of the network's load, and a "best effort" BW, which limits the BW that can be given to the ONU when the network is not loaded. Both services are enforced over time, rather than over a specific cycle.

Throughout the description of the preferred embodiment, we use a convention that transforms BW and rates into actual transmission grant sizes. As an example, assuming a fixed DBA algorithm cycle of n Time Quanta (TQ) and a half cycle of n/2 TQ, a rate of X Mbps (out of a total line rate of 1 Gbps in EPON technology) is equivalent to transmission of X/1000*n TQ in each cycle. According to the same convention, whenever the DBA algorithm starts processing the reports, it has n/2 TQ to allocate, which is equivalent to 0.5 Gbps. For example, if the cycle size is 1000 TQ, an ONU whose SLA allows it to transmit 100 Mbps should be allocated an average of 100 Mbps/1000 Mbps*1000 TQ=100 TQ per cycle (or every second half cycle), in order to transmit at the desired rate. Whenever the DBA algorithm starts running, it allocates the next 500TQ.

Figure 3D:
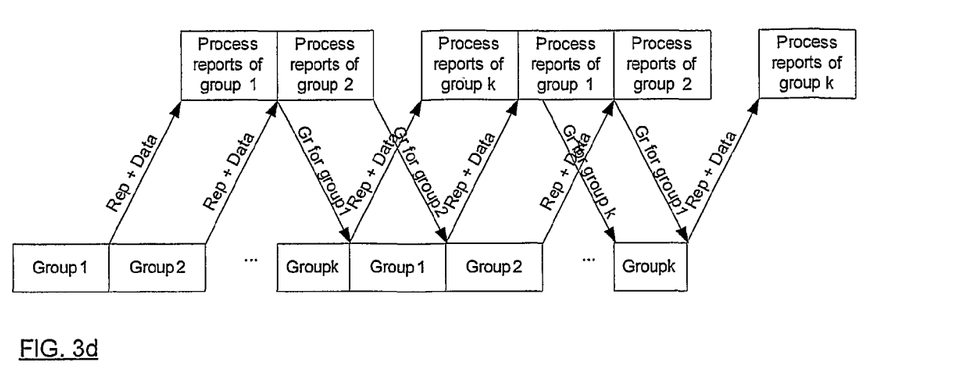
FIG. 3d shows schematically a reporting and granting scheme according to the "1/N cycle" DBA method of the present invention, where N>2.
Figure 3E:
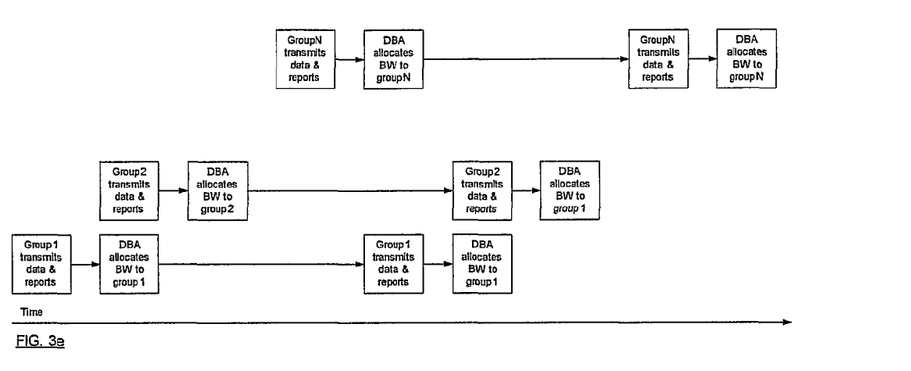
FIG. 3e shows the reporting and granting scheme of FIG. 3d in a flow chart representation.

FIGS. 3d, e show schematically an embodiment of the DBA algorithm of the present invention with a predefined grant cycle divided into more than two parts (1/N cycles where N>2). The ONUs are divided here into k groups, where k>2. In each 1/N cycle part, ONUs of one group transmit their data and reports while the DBA algorithm processes allocations for the other groups.

Figure 3F:
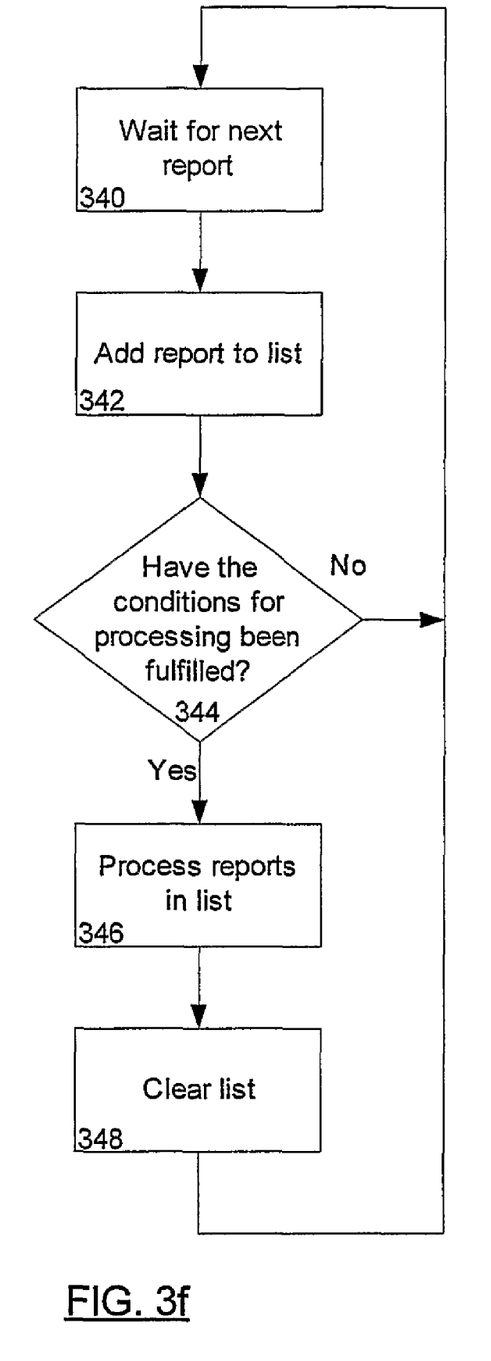
FIG. 3f presents an alternative embodiment of the DBA algorithm of the present invention.

FIG. 3f presents an alternative embodiment of the DBA algorithm of the present invention. This embodiment represents an improvement on a greedy algorithm or an immediate response algorithm. In this case, there is no implicit division of ONUs into groups, but rather a phase of accumulating the reports, represented by steps 340-344. In step 340, the algorithm waits for a next report. When the report arrives, it is added to a list in step 342, and a condition necessary for processing is checked in step 344. In the preferred embodiment, the condition checked is based on the division of ONUs into groups, as described in step 300. The condition is fulfilled (yes) once all the ONUs of one group have sent their reports, i.e. all their reports have been accumulated in the list. However, alternative embodiments of this step can be implemented without a strict definition of groups. For example, the condition in step 344 can be the arrival of R reports at the OLT (i.e. the processing start once R reports have accumulated). Note that the special case of R=1 reduces the alternative embodiment to a greedy algorithm, in which each report is triggered individually. Once the condition is fulfilled (yes), the DBA processes all the reports that were accumulated in the list in step 346. The processing preferably follows the procedure in step 302, wherein the "group" of ONUs in step 302 is the list of ONUs whose reports were accumulated in step 342.

Division of ONUs into Groups (Step 300)

As mentioned, in the preferred embodiment, the cycle is divided into half cycles. Ideally, the DBA algorithm will be able to allocate the BW fairly to all the ONUs of the same group within the same half cycle without violating their SLA. However, in case of uneven load (in which, for example, ONUs of one group have more data to transmit that the ONUs of the other group), this may not be possible. Therefore, the ONUs are preferably divided into groups in a way such that the DBA algorithm can at least allocate the guaranteed BW to all the ONUs of each group. Note however that this requirement is not essential, and other divisions, in which this requirement is not fulfilled, are also possible.

Figure 4:
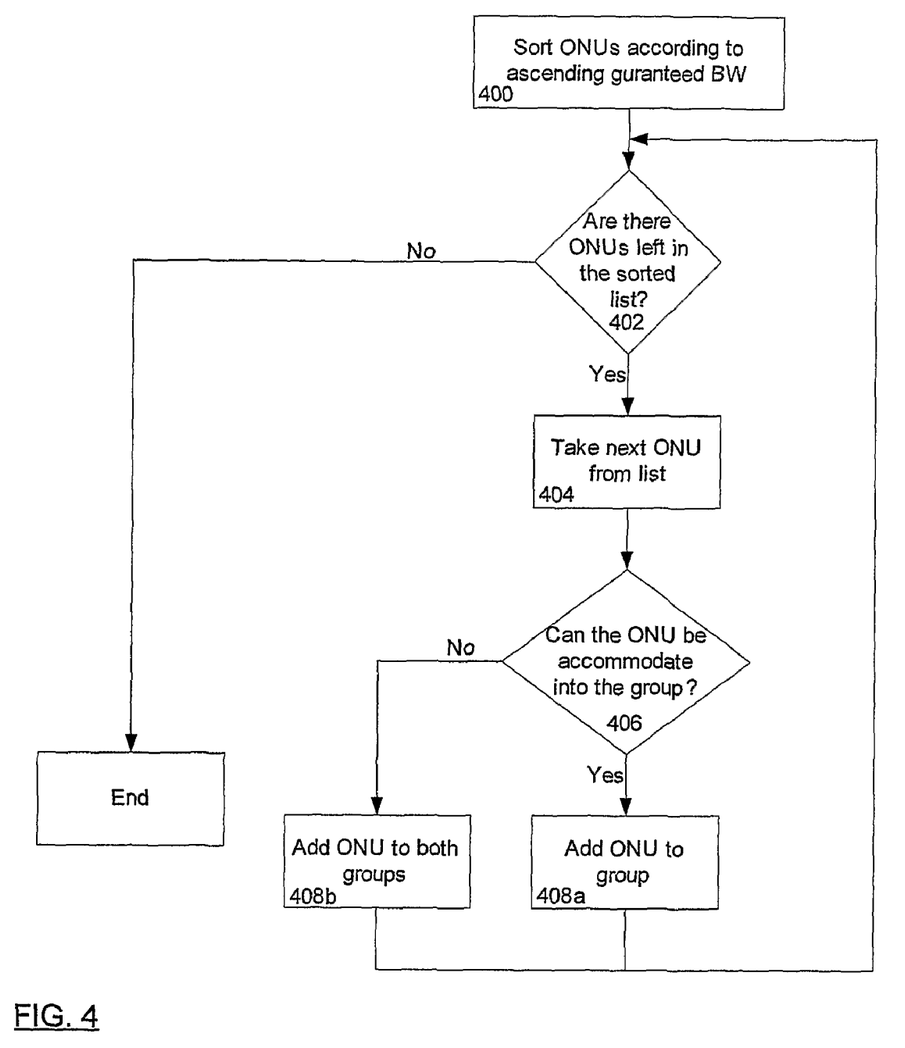
FIG. 4 shows an embodiment of an ONU group rearrangement scheme.

FIG. 4 shows a preferred division scheme, i.e. an elaboration on the division phase in step 300. In one embodiment, all the ONUs are sorted by ascending order of their guaranteed BW in step 400. The ONUs are then alternately divided between the groups (not shown). Step 402 checks if there are still ONUs in the sorted list. If yes, a "next" ONU with a guaranteed BW ("next ONU guaranteed BW") is taken from the list in step 404. If no, the process ends. Following step 404, step 406 checks if the "next" ONU can be accommodated in one of the two groups, i.e. if its addition to a respective group does not cause the sum of the guaranteed BW of the ONUs in this group to exceed half the line rate. If yes, the "next" ONU is added to this group in step 408a. Otherwise (No) the "next" ONU is added to both groups in step 408b and treated as two distinctive ONUs with a guaranteed BW which is smaller than the "next ONU guaranteed BW" such that the total guaranteed BW equals that of the original ONU and the sum of the guaranteed BW of the two groups is smaller than or equal to half the line rate.

As an example of the entire process in FIG. 4, let us assume that there are 4 ONUs, numbered 1, 2, 3 and 4 with respective guaranteed BWs of 50, 100, 200 and 500 Mbps. The line rate is 1000 Mbps. The ONUs are sorted by their guaranteed BW in step 400. Repeating the loop of steps 402, 404, 406 and 408a above, ONU1 will be added to group 1, ONU2 will be added to group 2 and ONU3 will be added to group 1. When the algorithm gets to step 406 with ONU4, the following computation takes place: the sum of the guaranteed BW in group1 is now 50+200=250 Mbps and the sum of the guaranteed BW in group2 is 200 Mbps. Adding ONU4 to group2 would cause the total guaranteed BW of this group to be 200+500, which is more than half the line rate (500 Mbps). ONU4 is therefore added to both groups in step 408b. In group 1, it is treated as an ONU with a guaranteed BW of 300 Mbps (so the total guaranteed BW of the group is 500 Mbps) and in group 2 it is treated as an ONU, with a guaranteed BW of 450−300=150 Mbps.

Allocation of Grants for a Half Cycle (Step 302)

To reduce fragmentation loss, the ONUs preferably report using threshold reporting and queue freezing mechanisms, where the report is of the queue capacity in whole packets up to a certain threshold. Such threshold reporting and queue freezing mechanisms are well known in the art. In the preferred embodiment, there are two numbers in the report—the "below threshold" report mentioned above and the total queue capacity. However, it would be apparent to one skilled in the art that there can be many alternative methods for such reporting schemes. When the ONU transmits data, it starts with the data that was reported in the "below threshold" report then transmits the data that was reported in the total queue capacity report, and eventually transmits data that entered the queue after the last report was issued.

Figure 5:
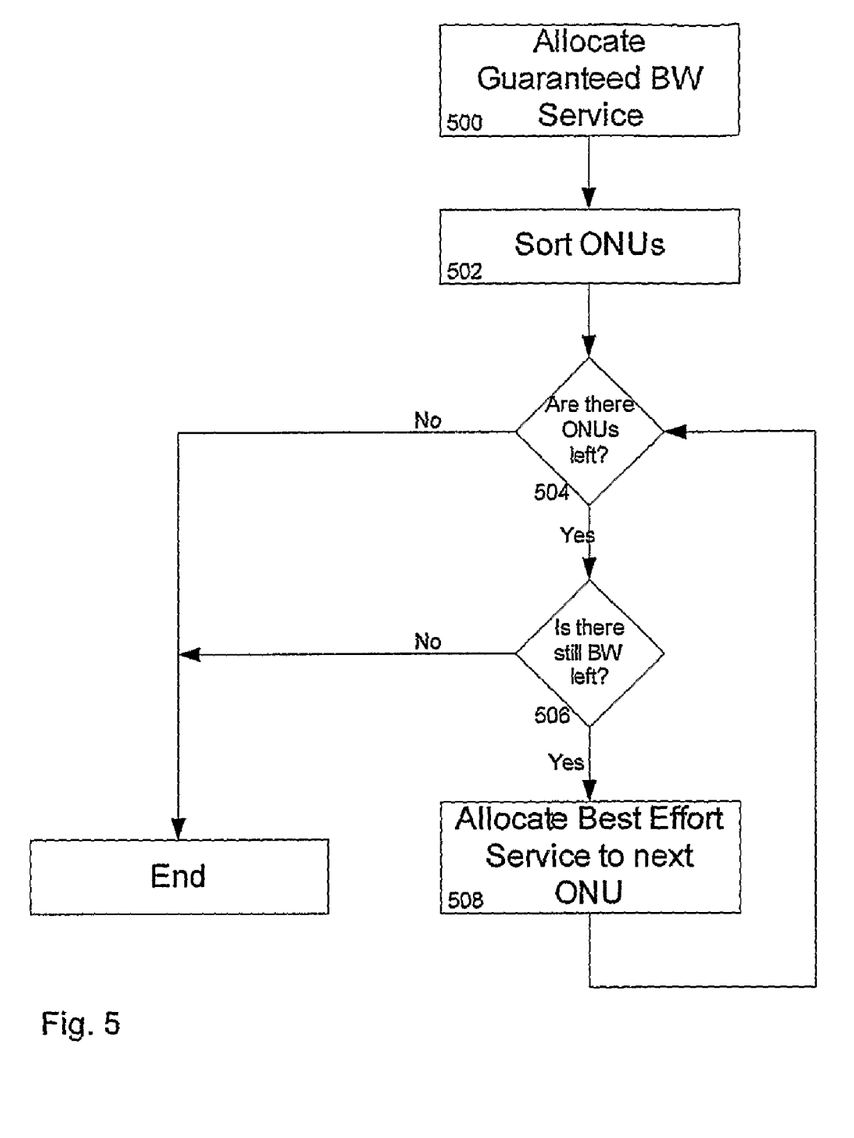
FIG. 5 shows details of the BW allocation mechanism of the present invention.

This allocation mechanism is described in detail in FIG. 5 and is performed every half cycle (or every part N of a cycle divided into N parts). In step 500, the DBA algorithm treats the reports below threshold as guaranteed service requests. The allocation mechanism grants the "below threshold" reports as long as the guaranteed BW in the SLA is not exceeded. There can be different ways to keep track of the guaranteed rate of each specific ONU. Preferably, the mechanism for this tracking is "leaky bucket". Alternative embodiments might have different allocation mechanisms. Step 500 is performed only for the ONUs of the group that reported in the specific half cycle (or every part N of a cycle divided into N parts)

Following step 500, the BW that was not allocated yet is allocated as a Best Effort Service (BES). All ONUs from both groups are considered for the BES. The exact way of allocating the BW is chosen according to a desired definition of fairness. However, to reduce fragmentation loss, the BES is preferably given to as few ONUs as possible. In step 502 the ONUs of both groups are sorted again to one list according to the fairness preference of the DBA. Preferably, the criteria for sorting the ONUs is the ratio of the number of transmitted bytes over a recent history divided by the guaranteed BW, as it appears in the SLA. The list is sorted such that the first ONU in the list is the one for which this ratio is lowest. Other criteria for this sorting procedure can be based on the past transmission rates of the ONU, its SLA or any other criteria.

In step 504, a check is run to see if there are still ONUs that did not receive BES. If there are such ONUs (yes) a second check is run in step 506 to see if there is still unallocated BW in the half cycle. If there is (yes), the next ONU from the list receives its BES in step 508, based on its report of total queue capacity, and the process loops back to step 504. If the answer is (no) in either one of checks 504 or 506, the process ends. To enforce a BES as decided in the SLA, the request of each ONU is preferably clipped by a leaky bucket mechanism and by the amount of the remaining TQ to be allocated in the half cycle. Preferably, there is one leaky bucket for each ONU for the sake of BES. Each ONU's respective leaky bucket value decrease rate is the rate of the BES, as decided in the SLA, and each ONU's respective leaky bucket value increase rate is the total grant given to the specific ONU. Alternative embodiments may include other SLA enforcement mechanisms, or not include any such mechanism, if there is no Best Effort indication in the SLA definition.

All patent applications mentioned in this specification are herein incorporated in their entirety by reference into the specification, to the same extent as if each individual patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. A method for dynamic bandwidth allocation in a passive optical network that includes an optical line terminal functionally coupled to at least three optical network units comprising the steps of:
    (a) in a configuration stage, dividing a predetermined grant cycle into cycle parts that are smaller in number than said optical network units;
    (b) by the optical line terminal, dividing the at least three optical network units into a plurality of optical network unit groups equal in number to said cycle parts; and
    (c) in each cycle part, concurrently allocating grants to the optical network units of one group while having the optical network units of at least one other group send reports and data to the optical line terminal.

2. The method of claim 1, wherein said predetermined grant cycle is divided into two half cycles.

3. The method of claim 2, wherein the dividing the optical network units into two optical network unit groups includes dividing the optical network units into two fixed optical network unit groups.

4. The method of claim 1, wherein said cycle parts all are equal.

5. The method of claim 1, wherein, in said configuration stage, an entire said predetermined grant cycle is divided into said cycle parts.

6. A method for dynamic bandwidth allocation in a passive optical network that includes an optical line terminal functionally coupled to at least three optical network units comprising the steps of:
    (a) in a configuration stage, dividing a predetermined grant cycle into only two half cycles;
    b) by the optical line terminal, dividing the at least three optical network units into only two optical network unit groups, each optical network unit having a Service Level Agreement; and (c) in each half cycle, allocating bandwidth fairly to all the optical network units of a respective optical network unit group.

7. A method for dynamic bandwidth allocation in a passive optical network that includes an optical line terminal functionally coupled to at least three optical network units comprising the steps of:
   (a) accumulating respective optical network unit reports from at least two of the optical network units, but not from all of the optical network units;
   (b) checking if the accumulated reports are in condition for processing;
   and if yes, (c) processing reports according to a given criterion, wherein the step of checking includes checking if all the optical network units of a selected optical network unit group have their reports on the list and, if yes, performing the step of processing by concurrently allocating grants to the optical network units of the selected optical network unit group while having the optical network units of at least one other optical network unit group send reports and data to the optical line terminal.

8. A method for dynamic bandwidth allocation in a passive optical network that includes an optical line terminal functionally coupled to a plurality of optical network units comprising the steps of:
   (a) in a configuration stage, dividing a predetermined grant cycle into two half cycles;
   (b) by the optical line terminal, dividing the plurality of optical network units into two optical network unit groups, each optical network unit having a Service Level Agreement; and
   (c) in each half cycle, allocating bandwidth fairly to all the optical network units of each optical network unit group; wherein the step of dividing the plurality of optical network units into two optical network unit groups includes dividing the optical network units into two fixed optical network unit groups, wherein the Service level Agreement includes a guaranteed bandwidth for each optical network unit, and wherein the step of allocating includes at least allocating the guaranteed bandwidth to all the optical network units of each optical network unit group; wherein the step of dividing the plurality of optical network units into two optical network unit groups includes:
      (i) sorting all the optical network units of the plurality into a sorted optical network unit list by ascending order of their guaranteed bandwidth, and
      (ii) alternately adding optical network units from the sorted list to the two optical network unit groups; and wherein the alternately adding optical network units from the sorted list to the two optical network unit groups includes checking the effect of the addition of a new optical network unit from the list on a sum of the guaranteed bandwidth of each optical network unit in an optical network unit group and comparing the sum with a half line rate value, whereby the decision to add the new optical network unit to one or both optical network unit groups depends on the results of the comparison.

9. A method for dynamic bandwidth allocation in a passive optical network that includes an optical line terminal functionally coupled to at least three optical network units comprising the steps of:
   (a) in a configuration stage, dividing a predetermined grant cycle into two equal half cycles;
   (b) by the optical line terminal, dividing the at least three optical network units into two fixed optical network unit groups; and
   (c) in each cycle part, concurrently allocating grants to the optical network milts of one group while having the optical network units of at least one other group send reports and data to the optical line terminal;
   wherein each optical network unit has a Service License Agreement that includes two services, a guaranteed bandwidth and a best effort bandwidth, and wherein the dividing the optical network units into two fixed optical network unit groups includes dividing in a way such that a dynamic bandwidth allocation algorithm of the optical line terminal can at least allocate the guaranteed bandwidth to all the optical network units of each optical network unit group.

10. The method of claim 9, wherein the dividing in a way such that the dynamic bandwidth allocation algorithm can at least allocate the guaranteed bandwidth to all the optical network units of each optical network unit group includes:
    (i) sorting all the optical network units by an ascending order of their guaranteed bandwidth and
    (ii) alternately dividing the sorted optical network units between the two optical network unit groups.

11. The method of claim 10, wherein the alternately dividing the sorted optical network units between the two optical network unit groups includes checking if the addition of a next optical network unit to a respective optical network unit group causes a sum of the guaranteed bandwidth of the optical network units in the respective optical network unit group to exceed a half line rate.

12. The method of claim 11, wherein, if the sum exceeds the half line rate, the alternately dividing the sorted optical network units between the two optical network unit groups includes adding the next optical network unit to both optical network unit groups.

13. A method for dynamic bandwidth allocation in a passive optical network that includes an optical line terminal functionally coupled to at least three optical network units comprising the steps of:
    (a) in a configuration stage, dividing a predetermined grant cycle into only two half cycles;
    (b) by the optical line terminal, dividing the at least three optical network units into only two fixed optical network unit groups, each optical network unit having a Service Level Agreement that includes a guaranteed bandwidth for each optical network unit; and
    (c) in each half cycle, allocating bandwidth fairly to all the optical network units of a respective optical network unit group.

14. The method of claim 13, wherein the step of dividing the at least three optical network units into only two optical network unit groups includes:
    (i) sorting all the optical network units into a sorted optical network unit list by ascending order of their guaranteed bandwidth, and
    (ii) alternately adding optical network units from the sorted list to the only two optical network unit groups.

15. The method of claim 13, wherein the allocating the guaranteed bandwidth to all the optical network units of each optical network unit group includes granting each optical network unit below threshold reports as long as the guaranteed bandwidth in the service level agreement is not exceeded.

16. The method of claim 15, wherein the step of allocating bandwidth fairly between the optical network units of each optical network unit group further includes allocating a remaining bandwidth to at least some of the optical network units of the plurality as a best effort service.

17. The method of claim 16, wherein the allocating a remaining bandwidth to all optical network units of the plurality as a best effort service includes sorting all the optical network units to a list according to a fairness criterion and allocating the remaining bandwidth following an order of optical network units on the list.

18. The method of claim 17, further comprising the step of checking if any of the optical network units in either optical network unit group has changed its status, and if yes, re-dividing the at least three optical network units into only two new optical network unit groups and repeating step (c).

* * * * *